Nov. 10, 1959     O. A. JOHNSON     2,912,196
ROD HOLDER
Filed July 18, 1955
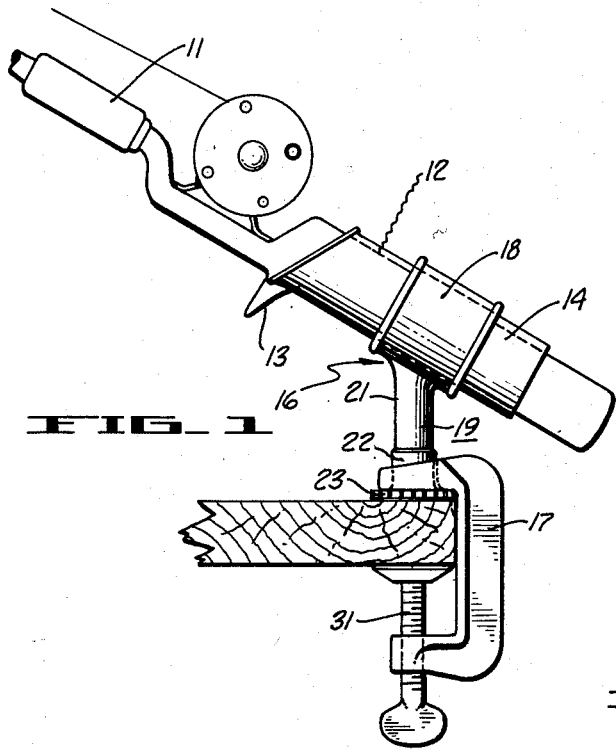
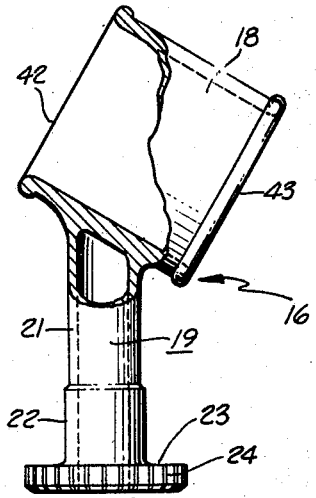
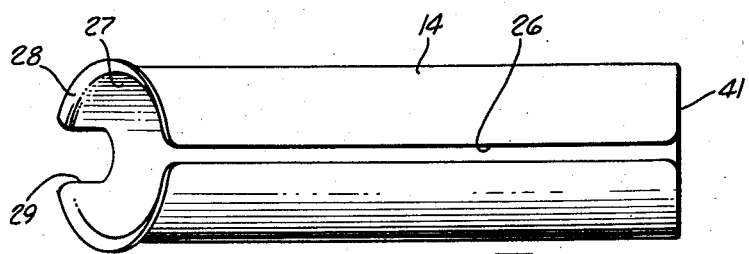
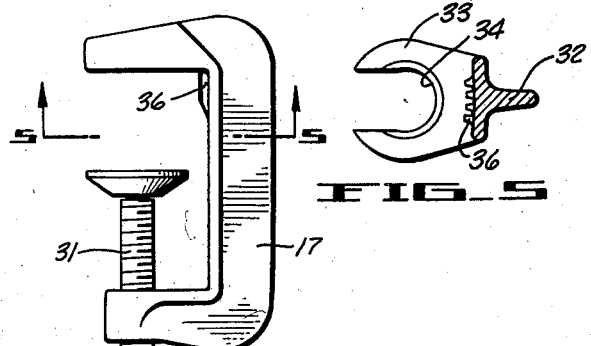
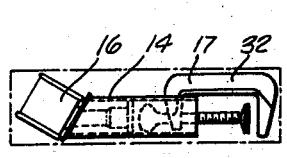
ONEY A. JOHNSON
INVENTOR.
BY
ATTORNEYS

United States Patent Office 2,912,196
Patented Nov. 10, 1959

2,912,196

ROD HOLDER

Oney A. Johnson, Menlo Park, Calif., assignor to Sampo, Inc., Barneveld, N.Y., a corporation of New York Application July 18, 1955, Serial No. 522,751

4 Claims. (Cl. 248—42)

This invention relates generally to rod holders, and more particularly to rod holders of the type which may be used for mechanically holding fishing rods in still or motion fishing.

Prior art devices are of many types. They range from simple bent wires to complex mechanical devices. In general, they do not provide a simple, flexible mount. For example, they cannot be readily adjusted to properly position the fishing rod in relation to the direction taken by the fishing line. They include a variety of mechanical safety devices for holding the rod secure. Thus, when a fish strikes, it becomes necessary to disengage a mechanical locking mechanism or to manipulate the rod in order to set the hook. In general they are bulky and require a large storage space.

It is a general object of the present invention to provide an improved rod holder.

Another object of the present invention is to provide novel means for holding a rod with safety and ease of removal.

It is a further object of the present invention to provide a rod holder in which the rod may be easily positioned in relation to the direction taken by the line.

It is a further object of the present invention to provide a rod holder in which the rod may be easily positioned in relation to the line and in which the rod is safely held in and easily removed from the holder.

It is still another object of this invention to provide a rod holder which may be disassembled and nested to require minimum storage space.

These and other objects of the invention will appear more clearly from the following description taken in conjunction with the accompanying drawings.

Referring to the drawings:

Figure 1 shows the rod holder and an associated fishing rod;

Figure 2 is a side elevational view of the rod tube support;

Figure 3 is a plan view of the rod tube;

Figure 4 is a side elevational view of the rod tube support clamp;

Figure 5 is a view taken along the line 5—5 of Figure 4; and

Figure 6 shows the rod holder disassembled and nested for storage.

Referring to Figure 1, a casting rod 11 having a handle 12 and finger grip 13 is shown mounted in the tube 14 of my fishing rod holder. The tube 14 is supported by the tube support 16 which is engaged by the clamp 17. The tube support 16 and clamp 17 will be presently described in detail. Generally this combination permits mounting the holder to horizontal, vertical or inclined supporting objects and yet to give the rod the proper position with relation to the direction taken by the fishing line.

The rod tube support 16 (Figure 2) is provided with a bore 18 disposed at one end of the leg portion 19. The bore 18 may be slightly tapered to facilitate the manufacture of the rod tube support. The leg portion 19 is preferably formed with two diameters 21 and 22 for purposes to be presently described. A support foot 23 is disposed at the other end of the leg 19. The foot 23 is preferably provided with a plurality of peripheral teeth 24 which are adapted to engage splines in the clamp 17 in a manner and for purposes to be presently described. The bore 18 is preferably inclined at an angle to the horizontal as illustrated in Figure 2. Thus, when the rod holder is clamped to a horizontal supporting object, the rod is carried at an angle, whereby gravity holds the rod within the tube 14.

The tube 14 (Figure 3) is of cylindrical form. This tube is adapted to slidably fit within the bore 18 of the rod support 16. The tube is preferably formed with a longitudinal separation 26. In practice, the tube (outer diameter) is made slightly greater than the inside diameter of the bore 18. Thus, when the tube 14 is inserted within the bore it is frictionally engaged. If the bore 18 is tapered as previously described, the tube accommodates itself for frictional engagement with the entire surface of the bore. It is to be understood, of course, that the rod tube may be formed without a separation 26 and that suitable means may be provided on the tube support for frictionally engaging the rod tube. For example, frictional engagement may be obtained by providing a spring slide in the bore 18. It is also possible to provide mechanical clamping means such as screws which pass through the member 16 and engage the rod tube. All such modifications are within the scope of this invention.

The rod tube 14 may be slidably adjusted for depth in the bore 18. Thus the position of the rod may be adjusted in this direction. The tube may also be inserted from the opposite end of the bore. This permits securing the rod holder in objects disposed at various angles, as will be presently described.

The rod tube 14 is angularly cut at one end 27 and is flared 28 to allow the rod to slide freely into the tube. The outwardly flared portion 28 of the tube 14 prevents abrasion of the rod handle. The notch 29 serves to engage the finger grip projection on a casting rod, or in the case of a spinning rod it serves to engage the reel support. As a result, the rod may be turned to any angular position and held in position to give the correct angle of presentation of the fishing rod to the fishing line. It is, of course, to be understood that the rod holder can accommodate other types of rods, flag poles, and other objects which do not engage the notch 29.

The clamp 17 is provided with a clamping screw 31 whereby it may be secured to various objects. The clamp is provided with a narrow reinforcing section 32. The end of the clamp opposite the screw is forked 33. The fork engages the rod tube support 16. The inner portion of the fork 33 is provided with an opening of greater diameter 34 which allows the greater diameter 22 of leg 19 to pass. The splines 36 formed in the inside of the clamp engage the teeth 24 formed on the foot 23 of the rod tube support. Thus to assemble the rod tube support to the clamp, the fork 33 is passed over the narrow portion 21 and the rod tube support inserted until the portion 22 lies opposite the opening 34 at which time the rod tube support may be lifted. When the rod tube support is lifted, the teeth 24 engage the splines 36 to thereby positively position the rod tube support 16. It is to be understood of course that the rod tube support may be positioned by constructing the foot 23 with indentations on its upper surface rather than having peripheral teeth, and the fork indented to mate therewith.

The direction taken by the rod may be adjusted by loosening the clamp 17 so that the peripheral teeth 24 are disengaged from the splines 36. The rod position may then be selected. The clamp is then tightened engaging the peripheral teeth 24 with the splines thereby positively positioning the rod.

Operation of the device for horizontal, vertical and inclined supporting objects is as follows: On horizontal supporting objects the end 41 of the rod tube 14 is inserted through the end 42 of the bore 18. The rod tube support 16 is rotated for the desired direction of the rod and locked in position by the clamp 17. The rod tube is then rotated for the correct presentation of the rod as would be normally done manually.

On a vertical supporting object the rod tube 14 is reversed and the end 41 is entered through the end 43 of the bore 18. The rod support is rotated for the desired direction of the rod and positively locked in position by the clamp 17. The rod tube is rotated for correct presentation of the rod to the direction of the line.

On inclined supporting objects, combinations of rod tube 14 rotation and rod tube support 16 rotation can be found for correct presentation of the rod. Similarly, correct combinations of rod tube 14 rotation and rod tube support 16 rotation may be found for inboard and outboard mounting of the rod holder on a boat.

It is apparent that the insertion or removal of the rod handle in the rod support tube is in a substantially straight line motion. There are no mechanical safety devices to disengage or any multiple motion manipulation required to free the rod. In practice, the act of removing the rod from the rod tube is the act of setting the hook.

For storage the rod holder may be disassembled and nested as shown in Figure 6. Thus, the rod tube support 16 may be inserted into the rod tube 14. The clamp 17 may be inserted with the reinforcing rib 32 fitting into the separation 26 of the rod tube. Thus the rod holder is compactly stored and requires a minimum of storage space. It is further to be noted that there is no danger of loosing a variety of parts, such as set screws, wing nuts, washers, since none of these are required in the mount described.

It is seen that I have provided a novel, simple and flexible rod holder. The rod holder is adaptable to being attached to surfaces disposed at its various angles. The rod holder permits rapid removal of the rod for setting the hook, yet the rod is safely held.

I claim:

1. A rod holder of the type which may be mounted on supporting means comprising a support stand having an inclined bore at one end and a foot at the other end thereof, said foot having a plurality of peripheral teeth, a tube slidably and rotatably received by said inclined bore, said tube comprising a longitudinally slit cylinder, one end of said cylinder being angularly cut, flared and notched, a clamp member including a clamping fork and a clamping screw, said clamping fork being adapted to overlie said support stand foot, and splines on said clamp member adjacent said fork and engageable with said peripheral teeth when said clamping fork is overlying said foot to secure the support stand against rotation, said clamping screw serving to clamp said stand to the supporting structure.

2. A rod holder of the type which may be mounted on supporting means comprising a support stand having an elongated leg portion terminating in an inclined bore at one end and an enlarged foot at the other end, said foot having a plurality of peripheral teeth, a longitudinally slit tube having a slightly larger outer diameter than the inner diameter of said bore, said tube being compressively received in said bore to carry the rod, a substantially C-shaped clamp member including a clamping fork at one end and a clamping screw at the other end, said clamp member being adapted to engage said leg portion with said fork in overlying relation to said foot, and splines on said clamp member selectively engageable with the peripheral teeth on said foot when the member is engaged with said leg portion to secure the support stand in a selected rotational position relative to the member, said clamping screw serving to clamp said stand to the supporting structure.

3. In a rod holder of the character described, a support stand comprising an elongated leg having an inclined bore at one end adapted to support the rod and a flanged portion at its other end forming a foot, said leg having a portion of enlarged cross section directly adjacent said foot, a clamp member formed with a forked end adapted to receive said support stand leg, said forked end having an outer opening through which the non-enlarged portion of the leg can pass and an enlarged inner opening in which said enlarged leg portion may be slidably received after the leg has been passed through the outer opening, and coacting means on said clamp member and support foot to secure the stand in a selected rotational position relative to the clamp member when said enlarged leg portion is positioned in said enlarged inner opening.

4. In a rod holder of the character described, a support stand comprising an upstanding cylindrical leg having an inclined bore at its upper end and an annular flange at its lower end forming a foot, said foot having a plurality of peripheral teeth, said leg having a portion of increased diameter directly above said foot, a longitudinally slit tube having a slightly larger outer diameter than the inner diameter of said bore, said tube being compressively received on said bore to carry the rod, a clamp member formed with a forked end adapted to engage said support stand leg in overlying relation to said foot, said forked end having an outer opening through which the portion of said leg above said increased diameter portion can pass with a close fit and an enlarged inner opening in which said increased diameter portion may be slidably received after said leg has been passed through the outer opening, and splines on said clamp member adjacent the forked end thereof and selectively engageable with the peripheral teeth on said foot when the member is engaged with said support stand leg to secure the stand in a selected rotational position relative to the member, said clamp member serving to secure the support stand and rod carried thereby to a supporting structure.

References Cited in the file of this patent

UNITED STATES PATENTS

| | | |
|---|---|---|
| 977,835 | Piscator | Dec. 6, 1910 |
| 2,055,842 | Haislip | Sept. 29, 1936 |
| 2,586,636 | Fischer et al. | Feb. 19, 1952 |
| 2,693,332 | Albert | Nov. 2, 1954 |
| 2,756,954 | Whitlow | July 31, 1956 |

FOREIGN PATENTS

| | | |
|---|---|---|
| 728,806 | France | Apr. 18, 1932 |